(12) United States Patent
Edsall et al.

(10) Patent No.: US 9,641,457 B2
(45) Date of Patent: *May 2, 2017

(54) SCALABLE LOW LATENCY MULTI-PROTOCOL NETWORKING DEVICE

(71) Applicant: Cisco Technology, Inc., San Jose, CA (US)

(72) Inventors: Thomas J. Edsall, Los Gatos, CA (US); Putu Harry Subagio, Cupertino, CA (US); Alessandro Fulli, San Jose, CA (US); Christopher A. Wildman, Alamo, CA (US); Mingzhe Li, Fremont, CA (US); Wei-Jen Huang, Burlingame, CA (US); Chih-Tsung Huang, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 14/702,186

(22) Filed: May 1, 2015

(65) Prior Publication Data

US 2015/0236982 A1 Aug. 20, 2015

Related U.S. Application Data

(63) Continuation of application No. 13/767,172, filed on Feb. 14, 2013, now Pat. No. 9,055,004.

(Continued)

(51) Int. Cl.
*H04L 12/28* (2006.01)
*H04L 12/947* (2013.01)
(Continued)

(52) U.S. Cl.
CPC .............. *H04L 49/25* (2013.01); *H04L 43/04* (2013.01); *H04L 45/74* (2013.01); *H04L 49/9057* (2013.01); *H04L 69/22* (2013.01)

(58) Field of Classification Search
CPC combination set(s) only.
See application file for complete search history.

(56) References Cited

U.S. PATENT DOCUMENTS

| | | | |
|---|---|---|---|
| 5,056,058 A | 10/1991 | Hirata et al. | |
| 5,916,305 A * | 6/1999 | Sikdar | G06F 17/2705 709/230 |

(Continued)

FOREIGN PATENT DOCUMENTS

| | | |
|---|---|---|
| EP | 2262186 A1 | 12/2010 |
| WO | 0111834 A1 | 2/2001 |

OTHER PUBLICATIONS

International Search Report and Written Opinion in International Application No. PCT/US2013/059346, mailed Dec. 11, 2013, 8 pages.

(Continued)

*Primary Examiner* — Frank Duong
(74) *Attorney, Agent, or Firm* — Edell, Shapiro & Finnan, LLC (57) ABSTRACT

A network device receives a packet that includes a plurality of sets of fields. Sets of fields of the packet are parsed and the field sets are evaluated as soon as they are available to determine whether a processing decision can be made on the packet. Additional field sets may be parsed from the packet and obtained in parallel with determining whether a processing decision can be made, but once it is determined that a processing decision can be made, the evaluating of field sets is terminated such that any further field sets of the packet are ignored for purposes of making a processing decision for the packet.

20 Claims, 4 Drawing Sheets

Related U.S. Application Data (60) Provisional application No. 61/702,312, filed on Sep. 18, 2012.

(51) Int. Cl.
*H04L 29/06* (2006.01)
*H04L 12/26* (2006.01)
*H04L 12/861* (2013.01)
*H04L 12/741* (2013.01)

(56) References Cited

U.S. PATENT DOCUMENTS

| | | | |
|---|---|---|---|
| 6,819,681 B1 * | 11/2004 | Hariharasubrahmanian | H04L 47/2441 370/498 |
| 6,892,237 B1 | 5/2005 | Gai et al. | |
| 6,961,777 B1 * | 11/2005 | Hariharasubrahmanian | H04L 49/00 370/389 |
| 7,106,731 B1 | 9/2006 | Lin et al. | |
| 7,395,332 B2 | 7/2008 | Gai et al. | |
| 7,474,666 B2 | 1/2009 | Kloth et al. | |
| 7,656,818 B1 | 2/2010 | Baroudi et al. | |
| 7,830,793 B2 | 11/2010 | Gai et al. | |
| 7,899,048 B1 | 3/2011 | Walker et al. | |
| 7,961,621 B2 | 6/2011 | Bergamasco et al. | |
| 7,969,971 B2 | 6/2011 | Gai et al. | |
| 8,077,734 B2 | 12/2011 | Musoll | |
| 8,208,389 B2 | 6/2012 | Alaria et al. | |
| 8,640,036 B2 | 1/2014 | Pignataro et al. | |
| 2005/0271073 A1 | 12/2005 | Johnsen et al. | |
| 2009/0238184 A1 | 9/2009 | Darnell et al. | |
| 2010/0158009 A1 | 6/2010 | Lee et al. | |
| 2010/0316052 A1 | 12/2010 | Petersen | |
| 2012/0177046 A1 | 7/2012 | Yamada et al. | |
| 2014/0079062 A1 | 3/2014 | Edsall et al. | |

OTHER PUBLICATIONS

International Search Report and Written Opinion in counterpart International Application No. PCT/US2013/059344, mailed Dec. 11, 2013, 10 pages.

Cisco Systems, Inc., "Cisco Nexus 3000 Series NX-OS Release Notes, Release 5.0(3)U2(1)," Aug. 31, 2011, pp. 1-12.

* cited by examiner

SCALABLE LOW LATENCY MULTI-PROTOCOL NETWORKING DEVICE

RELATED APPLICATIONS

This application is a continuation of U.S. Non-Provisional application Ser. No. 13/767,172, filed Feb. 14, 2013, still pending, which claims priority to U.S. Provisional Application No. 61/702,312, filed Sep. 18, 2012, entitled "Scalable Low Latency Multi-Protocol Networking Device", the contents of each of which are incorporated in their entirety herein by reference.

TECHNICAL FIELD

The present disclosure relates generally to reducing latency in a networking device.

BACKGROUND

High-performance computing (HPC) uses supercomputers and/or computer clusters to solve complex science, engineering and business projects using applications that require high bandwidth, low latency networking, and very high compute capabilities for packet transfer within a network. Open Systems Interconnection (OSI) model layers are typically utilized for processing packets within a network, such as for determining a route for packets to travel within the network from a source node to a destination node. Those model layers include OSI Layer 2 (Data Link), Layer 3 (Network) and Layer 4 (Transport).

Conventional networking devices, such as switches, are built upon a legacy approach where decisions are made serially. These decisions are logically grouped, for example, as Layer 2 (L2) bridging, Layer 3 (L3) routing, access control, etc. Although this approach simplifies design considerations, the serial approach also introduces inherent latencies because decisions are postponed and significant resources (i.e., duplicated tables) are consumed to satisfy the logical partition.

DESCRIPTION OF EXAMPLE EMBODIMENTS

Overview

According to the techniques presented herein, a network device receives a packet that includes a plurality of sets of fields. Sets of fields of the packet are parsed and the field sets are evaluated as soon as they are available to determine whether a processing decision can be made on the packet. Additional field sets may be parsed from the packet and obtained in parallel with determining whether a processing decision can be made, but once it is determined that a processing decision can be made, the evaluating of field sets is terminated such that any further field sets of the packet are ignored for purposes of making a processing decision for the packet.

Example Embodiments

During packet transmission through a network, network devices may perform one or more operations that introduce latency into the packet transmission process. One cause of latency in a network device, e.g., a switch, is a packet decision unit, also known as a Switching Information Base (SIB). The SIB makes processing decisions based on the content of the arriving packets and network policies. Significantly lowering the SIB latency can be achieved through new techniques presented herein that achieve a highly scalable, full-featured, low latency, and multi-protocol network device architecture through a paradigm that, for example, parallelizes traditionally serially processed logical actions.

Figure 1:
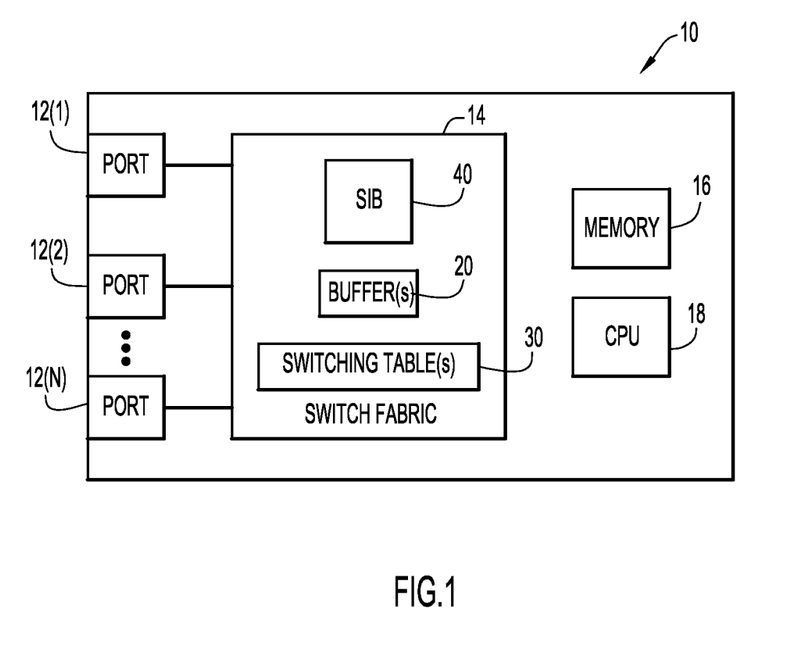
FIG. 1 is a block diagram of an example network device in which the techniques presented herein may be performed.

FIG. 1 is a block diagram of an example network device 10 configured to perform these techniques. The network device 10 includes a plurality of ports 12(1)-12(N) configured to receive packets from a network and to send packets to the network, a switch fabric 14 for switching packets among ports 12(1)-12(N), a central processing unit (CPU) 16, and a memory 18. The switch fabric 14 includes one or more buffer(s) 20, switching table(s) 30 and a packet decision unit 40, i.e., an SIB. The CPU 16 performs higher level control of the operations of the network device 10. The buffer(s) 20 temporarily stores packets within the network device 10, as packets are being processed.

The SIB 40 makes decisions including, but not limited to security, quality of service (QoS), statistics, ingress and egress access control policies, classification, marking, adding or deletion of packet fields, load balancing, multi-tenancy handling, Layer 2 bridging (switching) and Layer 3 routing, and dropping of packets. The switch fabric 14 may be implemented in digital logic gates in one or more application specific integrated circuits (ASICs).

Memory 18 may comprise read only memory (ROM), random access memory (RAM), magnetic disk storage media devices, optical storage media devices, flash memory devices, electrical, optical, or other physical/tangible memory storage devices. The CPU 16 is, for example, a microprocessor or microcontroller. Thus, in general, the memory 18 may comprise one or more tangible (non-transitory) computer readable storage media (e.g., a memory device) encoded with software comprising computer executable instructions and when the software is executed (by the CPU 16) it is operable to perform the techniques described herein. For example, the operations of the SIB 40 may be partially or completely performed in software stored in memory 18 and is executed by the CPU 16.

The network device 10 can be any network device now known or hereinafter developed, including a switch, router, gateway, a software stack on a host device, a virtual network interface card (VNIC), virtual switches, and a physical network interface card (including those that support virtualization).

Figure 2:
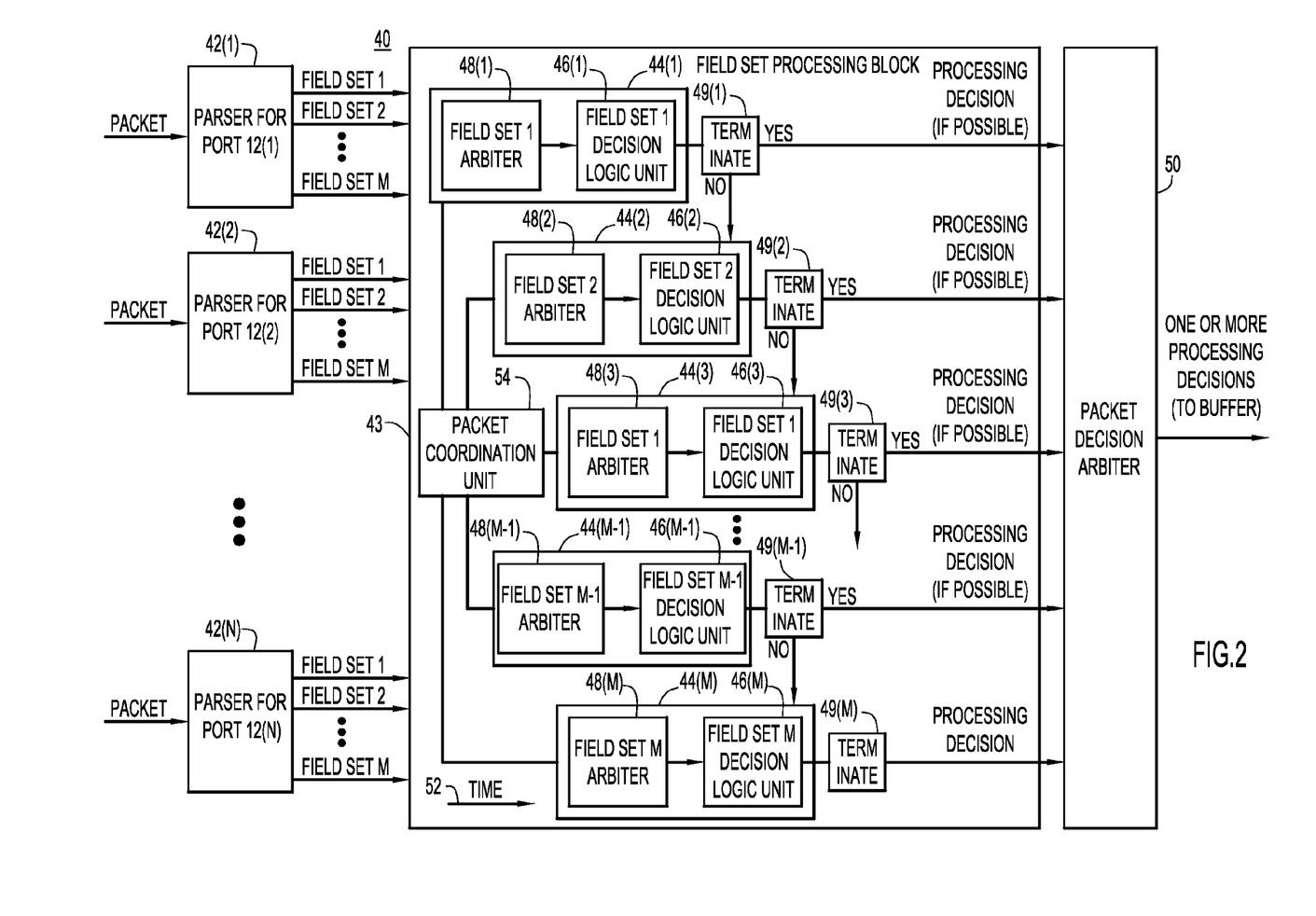
FIG. 2 is a detailed block diagram of a switch information base configured to make ultra-low latency processing decisions in the network device.

Turning now to FIG. 2, a more detailed diagram is shown for the SIB 40. To achieve scalability, multiple ports (not necessarily all ports) share a single SIB by serializing parsed data from the plurality of ports. Thus, for each of the ports 12(1)-12(N) there is a packet parser. Specifically, there is a parser 42(1) for port 12(1), a parser 42(2) for port 12(2), . . .

. , a parser 42(N) for port 12(N). Each packet parser 42(1)-42(N) parses packets received at the corresponding port and generates multiple sets of packet fields sequentially, then dispatches them as soon as they are ready. Packet fields may be organized arbitrarily into M field sets, denoted field set 1, field set 2, . . . , field set M. As an example, the parser may produce four sets of fields: field set 1 comprising Layer 2 (L2) fields, field set 2 comprising Layer 3 (L3) fields, field set 3 comprising Layer 4 (L4) fields and field set 4 comprising Deep Packet Inspection (DPI) fields. Thus, each field set comprises one or more fields.

The packet parsers 42(1)-42(N) are coupled to a field set processing block 43. The field set processing block 43 includes a plurality of field set specific decision sub-blocks 44(1)-44(M). Each field set specific decision sub-block is dedicated to a corresponding field set and comprises a field set decision logic unit and a field set arbiter. Thus, there is a plurality of decision logic units each of which is configured to determine whether a processing decision can be made for a packet based on a particular field set of the packet (and in some cases, also based on processing results from processing of a previous another field set for that packet).

Specifically, field set specific decision sub-block 44(1) includes field set 1 decision logic unit 46(1) and field set 1 arbiter 48(1), field set specific decision sub-block 44(2) includes field set 2 decision logic unit 46(2) and field set 2 arbiter 48(2), field set specific decision sub-block 44(3) includes field set 3 decision logic unit 46(3) and field set 3 arbiter 48(3), field specific decision sub-block 44(M−1) includes field set M−1 decision logic unit 46(M−1) and field set M−1 arbiter 48(M−1), and field set specific decision sub-block 44(M) includes field set M decision logic unit 46(M) and field set M arbiter 48(M). There are also terminate blocks 49(1)-49(M−1) associated with field set specific decision sub-blocks 44(1)-44(M−1). Processing decisions from the field set specific decision sub-blocks 44(1)-44(M−1) are output to a packet decision arbiter 50. Examples of the processing decisions that may be made by the decision logic units 46(1)-46(M) include a load balancing decision, a packet routing decision, a drop decision, and a switch (bridge) decision. All of the blocks shown in FIG. 2 may be implemented by digital logic gates.

The packet decision arbiter 50 arbitrates among processing decisions from the plurality of field specific sub-blocks 44(1)-44(M) so as to output one or more packet processing decisions to one or more buffers (shown in FIG. 1) so that the corresponding packets are written to and/or read from one or more buffers in the appropriate manner. As a result of early termination of a processing decision for packets, multiple processing decisions may arrive at the packet decision arbiter 40 simultaneously. The packet decision arbiter 50 is therefore responsible for scheduling/prioritizing the procession decisions and sends the processing decisions to the buffer whenever possible for processing in the buffer based on the processing decision. The scheduling priority of processing decisions by the packet decision arbiter 50 may be based on a strict priority, i.e., first-come first-serve basis, or based on one or more packet parameters associated with a packet obtained from one or more field sets of the packet, such as source port, destination port, COS, etc.

The operation of the field set processing block 43 is now described in more detail. FIG. 2 shows an arrow at reference numeral 52 indicating time. The physical arrangement of the field specific processing sub-blocks 44(1)-44(M) from left to right relative to the arrow 52 in FIG. 2 is meant to represent that processing by field specific processing sub-block 44(1) begins prior to processing by field specific processing sub-block 44(2) and ends prior to ending of processing by field specific processing sub-block 44(2). Likewise, processing by field specific processing sub-block 44(2) begins prior to processing by field specific processing sub-block 44(3) and ends prior to ending of processing by field specific processing sub-block 44(3), and so on. However, there is overlap in time with respect to the parsing of field sets from packets and the evaluating of field sets to determine whether a processing decision can be made for the packet. That is, field sets of a given packet are evaluated as soon as they are available and in parallel with the parsing of field sets from the packet to determine whether a processing decision can be made on the packet as soon as field sets are available and in parallel with the parsing. Evaluation of field sets is terminated once it is determined that a processing decision can be made such that any further field sets of the packet not yet evaluated are ignored for purposes of making a processing decision for the packet.

The processing by the field specific processing sub-blocks 44(1)-44(M) may be performed in a look-ahead manner based on a corresponding set of fields of a packet and results from at least one previous set of fields of the same packet. In other words, the field specific processing sub-blocks 44(2)-44(M) may use processing results from previous field specific processing sub-blocks, if a dependency exists between field sets. For example, field specific processing sub-block 44(2) may use processing results from field specific processing sub-block 44(1), field specific processing sub-block 44(3) may use processing results from field specific processing sub-blocks 44(1) and 44(2), and so on. In general, a decision logic unit for an Mth field set of the plurality of field sets is configured to evaluate the Mth field set of the plurality of field sets and processing results output by a decision logic unit for an (M−1)th field set. The organization of packet header fields may be dependent on how the individual decision logic units are designed.

As described above, each of the packet parsers 42(1)-42(N) outputs field sets 1 through M for each of the packets that arrive at a corresponding one of the ports 12(1)-12(N), and supplies sets of fields obtained from parsing to corresponding decision logic units in the field set specific decision sub-blocks 44(1)-44(M). Field set 1 data for all packets are directed to the field set 1 arbiter 48(1), field set 2 data for all packets are directed to field set 2 arbiter 48(2), field set 3 data for all packets are directed to field set 3 arbiter 48(3), field set M−1 data for all packets are directed to field set M−1 arbiter 48(M−1), . . . , and field set M data for all packets are directed to field set M arbiter 48(M).

As shown in FIG. 2, the field set 1 decision logic unit 46(1) may be operating on field set 1 data for a given packet while field set 2 data for that same packet is being supplied to field set 2 decision logic unit 46(2). If field set 1 decision logic unit 46(1) determines that a processing decision can be made for that packet, the terminate block 49(1) outputs that processing decision to the packet decision arbiter 50. Thus, field set 2 decision logic unit 46(2) may be operating on field set 2 data for a given packet at least partially in parallel with the field set 1 decision logic unit operating on field set 1 data for that packet. However, in some configurations, field set 2 decision logic unit 46(2) may require processing results of field set 1 decision logic unit 46(1) in order to determine whether a processing decision can be made. Likewise, field set 3 decision logic unit 46(3) may begin operating on field set 3 data for that same packet, once it is made available to it, in parallel with field set 2 decision logic unit operating on field set 2 data for that packet. Field set 2 decision logic unit 46(2) determines whether it can make a processing decision on the packet based on the field set 2 data and the processing results received from field set 1 decision logic unit 46(1) for that packet. If field set 2 decision logic unit 46(2) determines that a processing decision can be made for that packet, the terminate block 49(2) outputs that processing decision to the packet decision arbiter 50. Otherwise, the terminate block 49(2) outputs the processing decision results of field set 2 decision logic unit 46(2) to field set specific decision sub-block 44(3). A similar processing occurs in field set specific decision sub-block 44(3) with respect to field set 3 data for a packet based on the field set 3 data and the processing decision results from the field set 2 decision logic unit 46(2).

As additional field sets for a given packet are processed, more time will have elapsed since processing of field set 1 for that packet. However, once a processing decision can be made for the packet, the processing decision is output to the packet decision arbiter 50 and evaluation of field sets for that packet is terminated. Any further field sets of that packet not yet evaluated are ignored for purposes of making a processing decision for that packet. For example, if field set 1 decision logic unit 46(1) has determined that a processing decision can be made for the packet based on field set 1 data for that packet, then any evaluation being made by field set 2 decision logic unit 46(2) on field set data 2 for that packet is terminated. Terminate block 49(1) will output the processing decision made by field set 1 decision logic unit 46(1) to the packet decision arbiter 50. Field sets 2 through M are therefore ignored for purposes of determining a processing decision for that packet. If a processing decision cannot be made based on field set 1 for that packet, the terminate block 49(1) will output the processing decision results from field set 1 decision logic unit 46(1) to the field specific decision sub-block 44(2). If field set 2 decision logic unit 46(2) determines that a processing decision can be made for that packet, then any evaluating being performed by field set decision logic 3 is terminated and field sets 3 through M for that packet are ignored for purposes of making a processing decision for that packet. A similar operation continues, if necessary, for subsequent field sets of a packet. In general, if a processing decision is reached with any given field set decision logic unit S, processing is terminated early and sent to the packet decision arbiter 50. Field set S+1 are parsed during field set S processing and are ignored when it is determined that a decision has been made and processing can be terminated early.

For each decision logic unit 46(1)-46(M), arbitration is performed among a plurality of sets of fields obtained from packets received at the plurality of ports for processing by the corresponding decision logic unit. Specifically, field set 1 arbiter 48(1) selects field set 1 data received from one of the plurality of parsers 42(1)-42(M) for a given packet and supplies it to the field set 1 decision logic unit 46(1). Field set 2 arbiter 48(2) arbitrates among the plurality of field set 2 data received from the plurality of parsers 42(1)-42(N), and selects one field set 2 data for processing by the field set decision logic unit 48(2). For example, at any given instant of time, field set 1 data for packets from two or more ports (parsed by two or more parsers) may be arrive at field set specific sub-block 44(1). The field set 1 arbiter 48(1) selects field set 1 for one of the packets for evaluation by the field set 1 decision logic unit 46(1) at any given operating session of field set 1 decision logic unit 46(1). In one implementation, as soon as field set 1 decision logic unit 46(1) completes its evaluation of that field set 1 data, then the arbiter can select and supply field set 1 data for another packet to the field set 1 decision logic unit 46(1). A similar operation is performed, if necessary, by the field set arbiters in field set specific sub-blocks 44(2)-44(M). In a pipeline implementation, a field set may be supplied by an field set arbiter even before evaluation of another field set is complete.

A packet coordination unit 54 is provided that is coupled to each of the field set specific sub-blocks 44(1)-44(M) to track the processing of individual packets. Once it is determined that a processing decision can be made for a particular packet, a decision logic unit outputs a signal to the packet coordination unit 54. The packet coordination unit 54 supplies a control signal to the appropriate ones of the "downstream" or "deeper level" field set specific sub-blocks 44(1)-44(M) in order to ensure that any additional field sets of the particular packet are ignored and removed from the arbitration process to a decision logic unit for a deeper level field set of that packet, and any processing already initiated for a deeper level field set of the particular packet is terminated by a decision logic unit. The packet coordination unit 54 sends a control signal to one or more the downstream decision logic units about the early termination of a processing decision determination so that duplicate packet processing decisions (for the same packet) are not sent to the packet decision arbiter 50, and thus are removed from any arbitration by the packet decision arbiter 50. For example, the packet coordination unit 54 sends a control signal to one or more decision logic units evaluating deeper field sets of a given packet when a processing decision has been made for the packet so that evaluating of the deeper field sets is terminated and/or a processing decision obtained for one or more deeper field sets belonging to the same packet is removed from the arbitrating.

Furthermore, packet order through any two consecutive field set specific decision sub-blocks 44(S−1)-44(S) may be different. Therefore, processing decision results from field set specific decision sub-block 44(S−1) is synchronized with field set S data from a parser before field set S data can be processed. The packet coordination unit 54 may synchronize operations of the plurality of decision logic units in the field set specific decision sub-blocks 44(1)-44(M). Synchronization may take place either before or after arbitration of field set S transactions from ports 12(1)-12(N). Said another way, processing decision results for field sets associated with a plurality of packets are synchronized before or after arbitrating of field sets to decision logic units.

Figure 3:
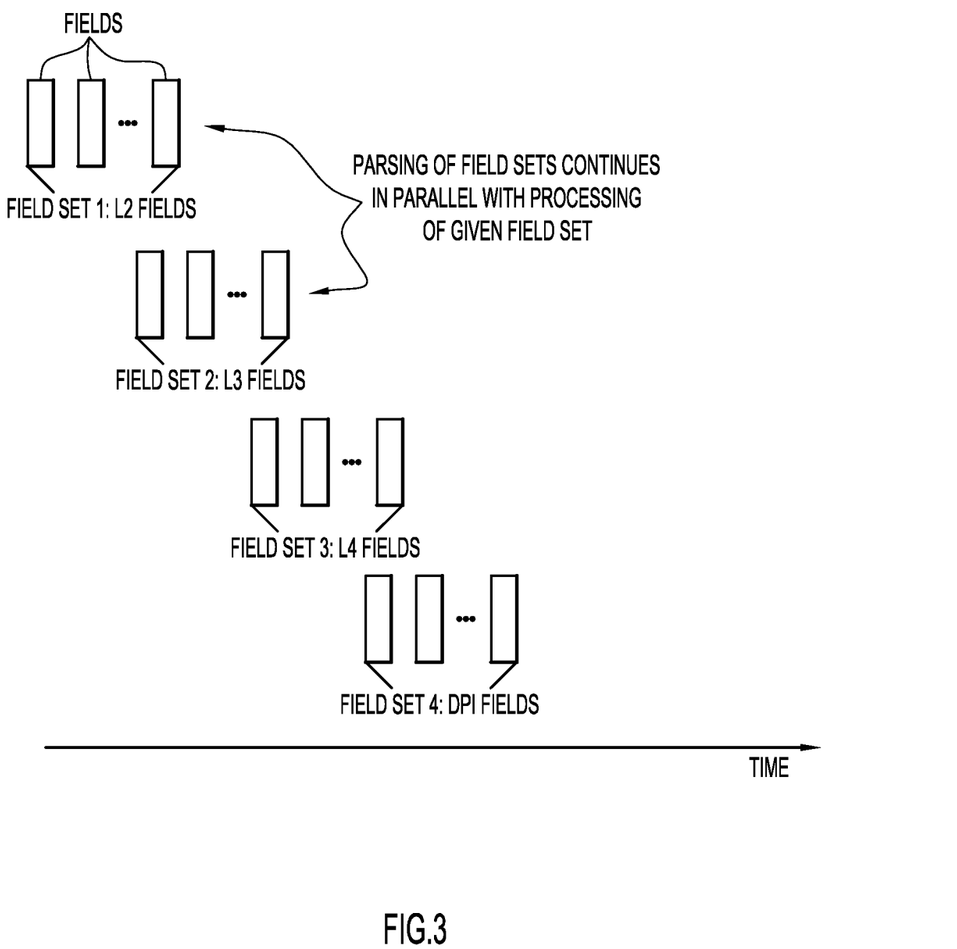
FIG. 3 is a diagram that graphically illustrates the processing of sets of fields of packets in order to make low latency processing decisions on packets in the network device.

Reference is now made to FIG. 3. FIG. 3 graphically illustrates the parallel processing of field sets of a packet over time that is achieved by the operation of the SIB 40 shown in FIG. 2. Each vertical block in FIG. 3 is representative of a field in a field set, and in this example, there are four field sets of a packet that are considered for packet processing. For example, field set 1 contains L2 fields, field set 2 contains L3 fields, field set 3 contains L4 fields, and field set 4 contains Deep Packet Inspection (DPI) fields. Examples of L2 fields include media access control (MAC) source address, MAC destination address, IEEE 802.1Q (virtual local area network) tag, Ethertype, Class of Service (COS) and Type of Service (TOS). Examples of L3 fields include Internet Protocol (IP) source address and IP destination address. Examples of L4 fields include source port, destination port, acknowledgment number, and sequence number. Parsing of field sets continues in parallel with the determination of a processing decision based on a given set of fields of a packet. However, once a processing decision can be made for a packet, no further field sets are processed for that packet, and the processing decision is output for arbitration handling, as described above.

Figure 4:
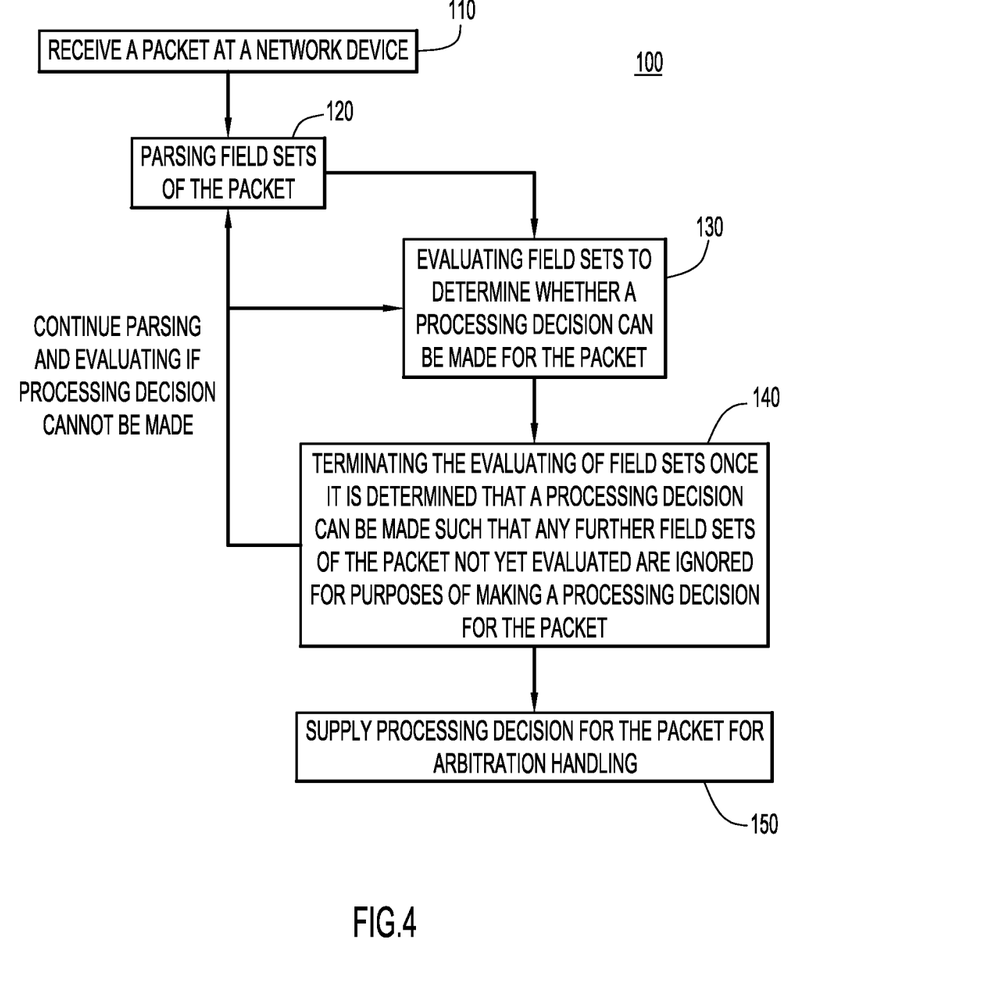
FIG. 4 is a flow chart generally illustrating the operations performed by the switch information base to make low latency processing decisions on packets.

Turning now to FIG. 4, a high level flow chart 100 is shown that depicts the operations performed by the SIB 40 in a network device. At 110, a packet is received at a network device. The packet includes a plurality of field sets, each field set including one or more fields. At 120, field sets of the packet are parsed. In parallel with the parsing, at 130, field sets are evaluated as soon as they are available to determine whether a processing decision can be made on the packet. At 140, the evaluating of field sets is terminated once it is determined that a processing decision can be made such that any further field sets of the packet not yet evaluated are ignored for purposes of making a processing decision for the packet. The processing decision, once made, is supplied for arbitration handling. The parsing and evaluating operations 120 and 130 continue until a processing decision is made or all field sets have been processed. It should be understood that, as described in connection with FIG. 2, packets are being received at a plurality of ports of the network device, and parsing of packets received each of the ports is performed to generate multiple sets of fields of each packet received at a corresponding port. There is arbitration performed with respect to processing of field set data from multiple packets, and arbitration performed with respect to execution of processing decisions made for multiple packets.

In summary, the foregoing presents techniques to greatly accelerate and thereby reduce latency associated with processing of packets in a network device. Sets of fields of a packet are parsed and delivered to discrete processing sub-blocks associated with a particular field set. One significant latency contributor of packet processing in a network device is waiting for all the required fields of a packet to be completely received before processing starts. Providing sets of fields of packets to the SIB immediately upon receipt according to the techniques described herein significantly improves latency.

The techniques presented herein achieve low latency with full scalability and functionality of a network device, such as a L2/L3 data center switch, with more than 3-times latency performance improvement over current devices.

The above description is intended by way of example only.

What is claimed is:

1. A method comprising:
   receiving packets at a network device, each packet including a plurality field sets, each field set including one or more fields;
   parsing the packets to generate the plurality of field sets from each packet;
   arbitrating among the plurality of field sets from each packet to provide field sets to corresponding decision logic units for processing thereby;
   evaluating the field sets of each packet with the corresponding decision logic units to determine whether a processing decision is able to be made on each packet as soon as field sets are available and in parallel with said parsing; and
   terminating the evaluating of field sets once it is determined that a processing decision is able to be made such that any further field sets of each packet not yet evaluated are ignored for purposes of making a processing decision for each packet.

2. The method of claim 1, wherein the processing decision is any one of: a load balancing decision, a packet routing decision, drop decision, and switch decision.

3. The method of claim 1, wherein receiving comprises receiving packets at each of a plurality of ports, and wherein parsing packets comprises parsing packets received at each of the ports to generate the plurality of field sets for each packet received at a corresponding port.

4. The method of claim 3, wherein the arbitrating includes arbitrating, for each decision logic unit, among the plurality field sets obtained from the packets received at the plurality of ports for processing by the corresponding decision logic unit.

5. The method of claim 4, wherein evaluating is performed based on a corresponding field set of a packet and results from evaluating of at least one previous field set of the same packet.

6. The method of claim 4, further comprising synchronizing operation of the plurality of decision logic units on field sets for a plurality of packets.

7. The method of claim 6, further comprising receiving a plurality of processing decision results from the plurality of decision logic units for a plurality of packets, and further comprising arbitrating among the plurality of processing decision results according to a scheduling priority based on a first-come first-serve basis or based on one or more packet parameters.

8. The method of claim 4, further comprising sending a control signal to one or more decision logic units evaluating deeper field sets of a given packet when a processing decision has been made for the packet so that evaluating of the deeper field sets is terminated and/or a processing decision obtained for one or more deeper field sets belonging to the same packet is removed from the arbitrating.

9. An apparatus comprising:
   a plurality of ports configured to receive packets from a network and to output packets to the network, each of the packets including a plurality of sets of fields;
   a plurality of parsers configured to parse packets received at the ports to obtain the plurality of field sets of each packet, each field set comprising one or more fields;
   a plurality of arbiters coupled to the plurality of the parsers to arbitrate among the plurality of field sets from each packet and provide arbitrated field sets to be evaluated:
   a packet decision unit including a plurality of decision logic units coupled to the plurality of parsers through the plurality of arbiters, and configured to:
     evaluate field sets of each packet to determine whether a processing decision is able to be made on the packet as soon as field sets are available from a corresponding arbiter and in parallel with the parsing performed by the plurality of parsers; and
     terminate evaluation of field sets once it is determined that a processing decision is able to be made such that any further field sets of the packet not yet evaluated are ignored for purposes of making a processing decision for the packet.

10. The apparatus of claim 9, wherein the plurality of decision logic units are each configured to evaluate a corresponding field set of the plurality of field sets to determine whether a processing decision is able to be made and to output processing results for that field set.

11. The apparatus of claim 10, wherein a decision logic unit for an Mth field set of the plurality of field sets is configured to evaluate the Mth field set of the plurality of field sets and processing results output by a decision logic unit for an (M−1)th field set.

12. The apparatus of claim 10, wherein the plurality of arbiters are each associated with a corresponding one of the plurality of decision logic units, each arbiter configured to receive a corresponding field set associated with two or more packets from two or more parsers, and to select one of the two or more field sets for evaluation by its associated decision logic unit.

13. The apparatus of claim 12, further comprising a packet decision arbiter configured to receive a plurality of processing decisions output by the plurality of decision logic units for a plurality of packets and to arbitrate among the plurality of processing decisions according to a scheduling priority based on a first-come first-serve basis or based on one or more packet parameters.

14. The apparatus of claim 12, and further comprising a packet coordination unit coupled to the plurality of arbiters and plurality of decision logic units, the packet coordination unit configured to supply a control signal to appropriate ones of plurality of decision logic units in order to ensure that once a processing decision has been determined for a particular packet, any additional field sets of the particular packet are ignored and removed from the arbitration process of the arbiters and any processing already initiated by a decision logic unit for a deeper level field set for the particular packet is terminated.

15. A non-transitory computer readable tangible storage media encoded with instructions that, when executed by the processor, cause the processor to:
  parse field sets of packets received at a network device, each packet including a plurality of field sets, and each field set including one or more fields;
  arbitrate among the plurality of field sets from each packet to provide field sets to corresponding decision logic units for processing thereby;
  evaluate the field sets of each packet with the corresponding decision logic units to determine whether a processing decision is able to be made on each packet as soon as field sets are available and in parallel with the parsing; and
  terminate the evaluation of field sets once it is determined that a processing decision is able to be made such that any further field sets of the packet not yet evaluated are ignored for purposes of making a processing decision for the packet.

16. The non-transitory computer readable storage media of claim 15, wherein the instructions that, when executed by the processor, cause the processor to parse comprise instructions that cause the processor to parse packets received each of a plurality of ports of the network device to generate the plurality of field sets for each packet received at a corresponding port.

17. The non-transitory computer readable storage media of claim 16, wherein the instructions that cause the processor to arbitrate include instructions that, when executed by the processor, cause the processor to:
  arbitrate, for each decision logic unit, among a plurality field sets obtained from packets received at the plurality of ports for processing by the decision logic unit.

18. The non-transitory computer readable storage media of claim 15, further comprising instructions that, when executed by the processor, cause the processor to:
  determine whether a processing decision is able to be made for a packet based on a particular field set of the packet with a particular decision logic unit of a plurality of decision logic units; and
  supply field sets to corresponding decision logic units.

19. The non-transitory computer readable storage media of claim 15, further comprising instructions that, when executed by the processor, cause the processor to:
  synchronize operation of the plurality of decision logic units on field sets for a plurality of packets.

20. The non-transitory computer readable storage media of claim 15, wherein the instructions that cause the processor to arbitrate include instructions that, when executed by the processor, cause the processor to:
  arbitrate among a plurality of processing decision results from the plurality of decision logic units for a plurality of packets according to a scheduling priority based on a first-come first-serve basis or based on one or more packet parameter.

* * * * *